US 6,684,266 B2

(12) United States Patent
Faber et al.

(10) Patent No.: US 6,684,266 B2
(45) Date of Patent: Jan. 27, 2004

(54) STORAGE AREA NETWORK (SAN) FIBRE CHANNEL ARBITRATED LOOP (FCAL) MULTI-SYSTEM MULTI-RESOURCE STORAGE ENCLOSURE AND METHOD FOR PERFORMING ENCLOSURE MAINTENANCE CONCURRENT WITH DEVICE OPERATIONS

(75) Inventors: Troy Evan Faber, Rochester, MN (US); Frederic Lawrence Huss, Rochester, MN (US); Daniel Frank Moertl, Rochester, MN (US); Paul Gary Reuland, Rochester, MN (US); Timothy Jerry Schimke, Oronoco, MN (US); Russell Paul VanDuine, Rochester, MN (US); Bruce Marshall Walk, Rochester, MN (US); Todd Jason Youngman, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 09/810,645

(22) Filed: Mar. 16, 2001

(65) Prior Publication Data

US 2002/0133736 A1 Sep. 19, 2002

(51) Int. Cl.$^7$ ................................................. G06F 3/00
(52) U.S. Cl. ........................... 710/20; 710/17; 710/74; 712/225; 709/226; 711/100
(58) Field of Search ........................ 710/2, 7, 15, 17, 710/18, 36, 52, 62, 101, 12, 20, 31, 64, 72–74; 709/223, 226, 229, 134, 213; 713/1; 712/225; 711/100

(56) References Cited

U.S. PATENT DOCUMENTS 6,057,863 A * 5/2000 Olarig ........................ 345/520
6,343,324 B1 * 1/2002 Hubis et al. ................. 709/229
6,393,535 B1 * 5/2002 Burton et al. ............... 711/158
6,412,068 B1 * 6/2002 Nolan et al. .................. 713/1
6,425,035 B2 * 7/2002 Hoese et al. ................. 710/129
6,538,669 B1 * 3/2003 Lagueux et al. ............. 345/764
6,553,408 B1 * 4/2003 Mercell et al. .............. 709/213
6,578,122 B2 * 6/2003 Beukema et al. ............ 711/163

* cited by examiner

*Primary Examiner*—Jeffrey Gaffin
*Assistant Examiner*—Rijue Mai
(74) *Attorney, Agent, or Firm*—Joan Pennington

(57) ABSTRACT

A storage area network (SAN) fibre channel arbitrated loop (FCAL) multiple system, multiple resource, storage enclosure and a method are provided for performing enclosure maintenance concurrent with device operations. The storage enclosure includes a plurality of storage resources or storage devices, a plurality of IO adapters (IOAs) coupled to the storage area network and a pair of enclosure services node cards. Each enclosure services node card includes loop connections for the plurality of storage resources. Each enclosure services node card includes a respective global bus connection and a loop connection to each of the plurality of IOAs. Each enclosure services node card is used concurrently by the multiple systems to manage the plurality of storage resources. In the method for performing enclosure maintenance concurrent with device operations, identical maintenance procedures are implemented for the enclosure services node cards and the storage devices. The enclosure services node cards are removable cards and contain active components including port bypass circuits (PBCs). Fibre channel (FC) connections for the plurality of storage resources provide redundant paths to each storage resource and allows access to data on the storage resources to continue when one of the pair of enclosure services node cards fails or is being maintained. Out of band communications to the enclosure services node cards are provided with the global buses, such as I2C buses, rather than FC loop. Multiple IOAs can concurrently use the same enclosure services node card without contention or collision.

16 Claims, 6 Drawing Sheets

STORAGE AREA NETWORK (SAN) FIBRE CHANNEL ARBITRATED LOOP (FCAL) MULTI-SYSTEM MULTI-RESOURCE STORAGE ENCLOSURE AND METHOD FOR PERFORMING ENCLOSURE MAINTENANCE CONCURRENT WITH DEVICE OPERATIONS

FIELD OF THE INVENTION

The present invention relates generally to the data processing field, and more particularly, relates to a storage area network (SAN) fibre channel arbitrated loop (FCAL) multi-system, multi-resource storage enclosure, and a method for performing small computer system interface (SCSI) enclosure services (SES) node maintenance concurrent with device operations.

DESCRIPTION OF THE RELATED ART

It is common in the computer industry to have a storage area network (SAN) that uses fibre channel arbitrated loop (FCAL) technology to connect multiple systems to multiple FCAL storage resources such as, for example, disk, tape, optical devices. Storage enclosures including multiple FCAL storage resources typically are used as part of the SANs. A small computer system interface (SCSI) enclosure services (SES) node is required to control resources such as power, LEDs, port bypass circuits (PBCs) and to collect status or general information such as device present, power good, vital product data (VPD) and the like.

As used in the following description and claims, it should be understood that the term SCSI in SCSI enclosure services (SES) node is a general term applicable to more than just physical SCSI components.

A conventional storage enclosure or storage box used as part of SANs presents a maintenance problem. Typical storage enclosures provide concurrent maintenance capability for devices, power supplies, and sometimes for adapters. However, failures of other active components, such as FCAL port bypass circuits (PBCs) typically located on the backplane of the storage enclosure, require the storage enclosure to be taken offline for service and repair. In a highly reliable, available system, outages to perform maintenance are very undesirable because of the loss of access to the data.

It is desirable to provide an improved storage area network (SAN) fibre channel arbitrated loop (FCAL) multi-system, multi-resource, storage enclosure. A need exists for such storage enclosure that provides improved reliability. It is desirable to provide such storage enclosure that enables maintenance to all active components while allowing the storage enclosure to remain online.

SUMMARY OF THE INVENTION

Principal objects of the present invention are to provide a storage area network (SAN) fibre channel arbitrated loop (FCAL) multi-system, multi-resource, storage enclosure and a method for performing enclosure maintenance concurrent with device operations. Other important objects of the present invention are to provide such storage enclosure and method substantially without negative effect and that overcome many of the disadvantages of prior art arrangements.

In brief, a storage area network (SAN) fibre channel arbitrated loop (FCAL) multiple system, multiple resource, storage enclosure and a method are provided for performing enclosure maintenance concurrent with device operations. The storage enclosure includes a plurality of storage resources or storage devices, a plurality of IO adapters (IOAs) coupled to the storage area network and a pair of enclosure services node cards. Each enclosure services node card includes loop connections for the plurality of storage resources. Each enclosure services node card includes a respective global bus connection and a loop connection to each of the plurality of IOAs. Each enclosure services node card is used concurrently by the multiple systems to manage the plurality of storage resources. In the method for performing enclosure maintenance concurrent with device operations, identical maintenance procedures are implemented for the enclosure services node cards and the storage devices.

In accordance with features of the invention, the enclosure services node cards are removable cards and contain active components including port bypass circuits (PBCs). Fibre channel (FC) connections for the plurality of storage resources provide redundant paths to each storage resource and allows access to data on the storage resources to continue when one of the pair of enclosure services node cards fails or is being maintained. Out of band communications to the enclosure services node cards are provided with the global buses, such as I2C buses, rather than FC loop. Multiple IOAs can concurrently use the same enclosure services node card without contention or collision.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
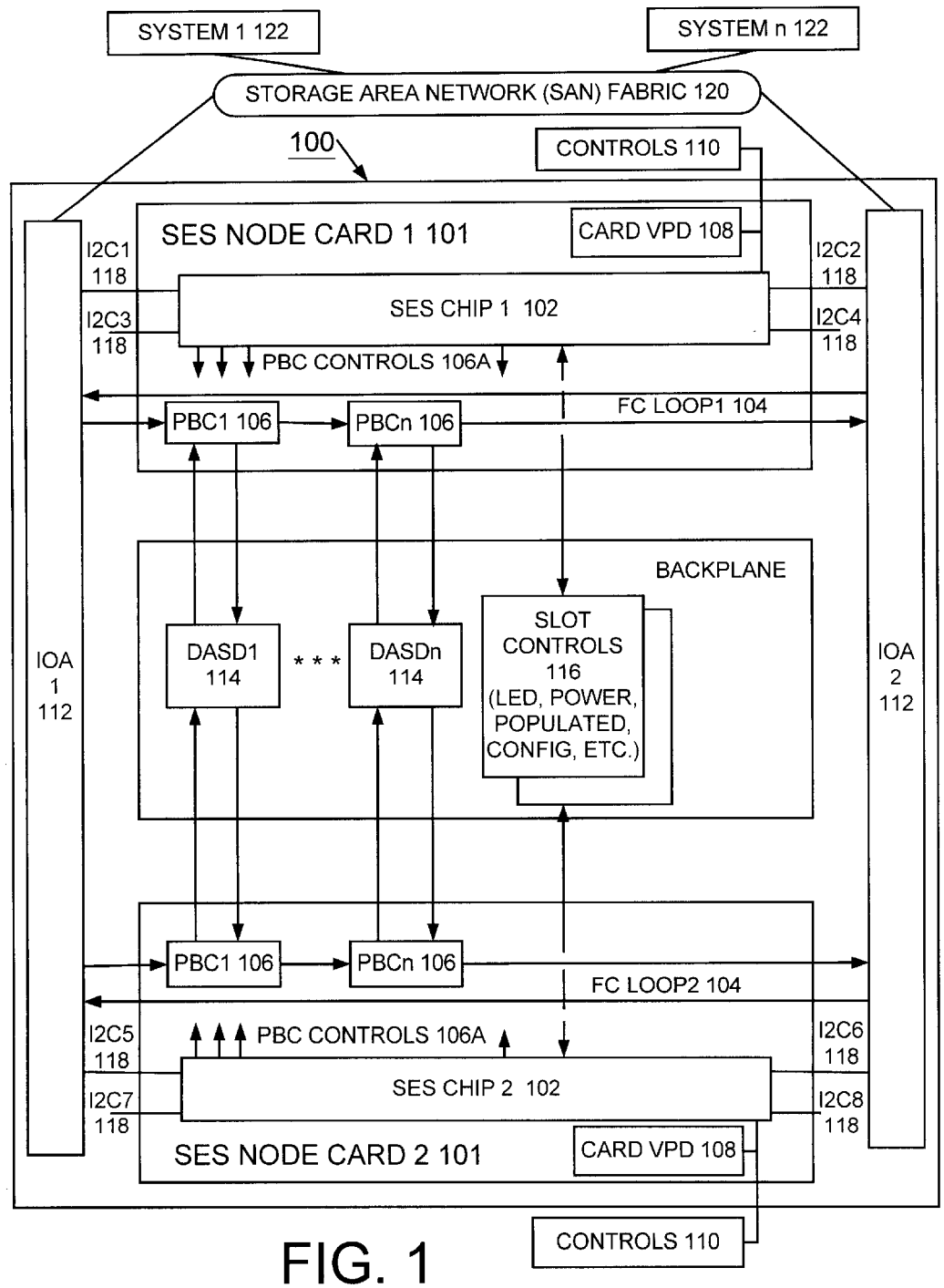
FIG. 1 is a block diagram representation illustrating a storage area network (SAN) fibre channel arbitrated loop (FCAL) multi-system, multi-resource, storage enclosure with dual IO adapters in accordance with the preferred embodiment.

Having reference now to the drawings, in FIG. 1, there is shown a storage area network (SAN) fibre channel arbitrated loop (FCAL) multi-system, multi-resource, storage enclosure with dual IO adapters of the preferred embodiment generally designated by the reference character 100. As shown in FIG. 1, storage enclosure 100 includes a pair of SES node cards 1, 2, 101. SES node cards 1, 2, 101 of the preferred embodiment can be used concurrently by multiple host systems 122 to manage multiple shared storage resources, such as FCAL DASDs 1-n, 114.

SES node cards 1, 2, 101 respectively include a SES chip 1, 2 102, a FC loop 1, 2, 104, a plurality of FCAL port bypass circuits (PBCs) 1-n, 106 and a card vital product data (VPD) 108. SES chip 1, 2 102 receive controls from a respective external control function 110. SES chip 1, 2 102 provide PBC controls 106A to the PBCs 1-n, 106. Storage enclosure 100 includes a pair of IO adapters (IOAs) 1, 2, 112. A backplane of the storage enclosure 100 includes a plurality of direct access storage devices (DASDs) 1-n, 114 and slots controls 116 for LED, power, populated, configuration, and the like.

Figure 2:
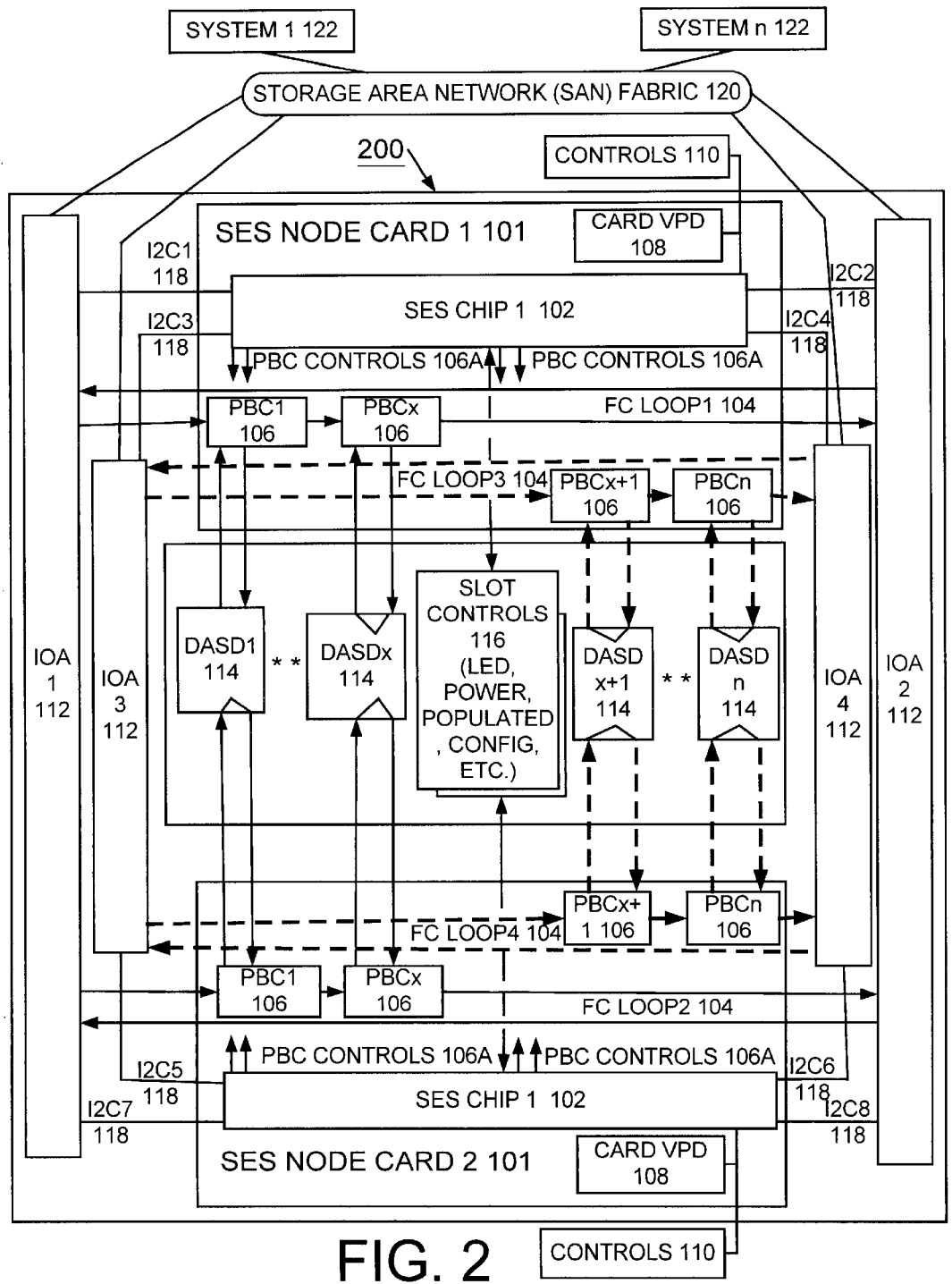
FIG. 2 is a block diagram representation illustrating a storage area network (SAN) fibre channel arbitrated loop (FCAL) multi-system, multi-resource, storage enclosure with four IO adapters in accordance with the preferred embodiment.

SES node cards 1, 2, 101 of the preferred embodiment support both a global bus, such as, inter integrated circuit (I2C) and fiber channel (FC) connections for a plurality of external IOAs, for example, four external IOAs 1–4, 112 as shown in FIG. 2. SES node cards 1, 2 support FC connections for a plurality of DASDs 1-n, 114 on the backplane, for example, twenty-four DASDs 114. I2C connections are provided to VPD chips (not shown) on the backplane and to another SES node card. SES chips 1, 2 102 included on respective SES node cards 1, 2, 101 provide multiple I2C interfaces for IOA firmware accesses, an I2C interface shared for VPD reads, port bypass circuit control, sensing device plugged and bypass enable signals from devices on the backplane, sensing backplane version bits, sensing DASD configuration, such as a big loop mode with two IOAs of FIG. 1 and little loop mode with four IOAs of FIG. 2, and controls concurrent maintenance LEDs for devices on the backplane. Using enables from the SES chips 1, 2, 102, port bypass circuits (PBCs) 1-n, 106 control whether DASDs 1-n, 114 on the backplane and the IOAs 112 attached to the SES node cards 1, 2, 101 are on the FC loop, FC loop1, FCloop2, 104. Using control information, for example, configuration pin on the backplane, PCBs 1-n, 106 determine a number of devices, DASDs 1-n, per loop.

A storage area network (SAN) fabric is coupled to the IOAs 1, 2, 112 and to multiple systems 1-n, 122. Each SES node is packaged like a typical device allowing the SES node to be easily inserted and removed from the storage enclosure. The SES node is reported to a host system 122 like a typical device with vital product data VPD 108, such as serial number and hardware revision level and a unit address used to identify location within the storage enclosure 100. Typically the unit address corresponds to an address on a bus or loop, such as FC loop1, FC loop2, 104.

In accordance with features of the preferred embodiments, out-of band communications with SES nodes 1, 2, 101 are provided with inter integrated circuit (I2C) buses I2C1–I2C8, 118 respectively coupled to a SES chip 1, 2 102. As shown in FIG. 1, buses I2C1 and I2C2, 118 are respectively connected between the IOA1, IOA2, 112 and SES chip 1 102. Buses I2C5 and I2C6, 118 are respectively connected between the IOA1, IOA2, 112 and SES chip 2 102. For out-of-band communications with SES nodes 1, 2, the device bus FC loop1, FC loop2, 104 is not used. Each SES node 1, 2, 101 is assigned a special address which does not conflict with any devices that could be on the loop. Availability of the SES node functions is significantly improved via the I2C attachment to IOAs 112 rather than the conventional FCAL loop attachment to IOAs. Multiple IOAs can concurrently use the same SES node 101 without contention or collision problems. Slot controls 116 on the backplane can be concurrently managed by the SES nodes 101 transparently to the systems 122 and IOAs 112 without contention or collision problems and without inter adapter or inter system communication.

In accordance with features of the preferred embodiments, all active components of storage enclosure 100 including the SES node cards 1, 2 are provided on removable cards, rather than on the backplane. All the active components applicable to a given device bus or loop, such as the PBCs 106 are placed onto the SES node card 101. This allows the replacement of a SES node card 101 to accomplish the replacement of all active components for a given loop. Passive components, such as wires, connectors, and the like remain on the backplane. The passive components have a much lower error rate so that the overwhelming majority of maintenance actions can be accomplished by replacing a removable card. As shown in FIG. 1, a respective SES node card 1, 2, 101 is used with each physical device bus or loop, FC loop 1, 2, 104. As shown in FIG. 1, the two SES node cards 1, 2 are used to form a pair of FCAL loops to connect to dual-ported devices.

In accordance with features of the preferred embodiments, the two SES node cards 1, 2, 101 are used with FC loop 1, 2, 104 as shown in FIG. and PBC 1-n, 106 in each SES node card 1, 2, 101 are used with redundant paths to each device, DASD 1-n, 114. Each SES node card 1, 2, 101 only affects one of the redundant paths such that loss of a single SES node does not cause loss of access to the devices. This enables access to the data on the devices to continue while one SES node 101 is failed or is being maintained. Access to the data on the devices DASD1-n, 114 continues when a given SES node is being maintained.

Slots in the enclosure 100 into which SES nodes are placed have maintenance features, such as slot controls 116 including LEDs and power control. A different SES node controls maintenance features for a given SES node. For example, maintenance features for a given SES node 1 are controlled by SES node 2. A SES node cannot control its own maintenance features because the SES node might be inoperable and control of these maintenance features needs to persist through maintenance actions when the SES node is inserted and removed. Each SES node controls the opposite SES node's resource, where opposite means the SES node responsible for the other companion redundant path to a device, such as DASD1, 114.

Storage enclosure 100 enables the SES node to be treated like a typical device when maintenance is needed, allowing maintenance concurrent with device operations in accordance with the preferred embodiment. Concurrent maintenance actions for the SES node cards 1, 2 are accomplished following the same sequential steps as concurrent maintenance actions for devices, as illustrated and described with respect to FIGS. 3, 4, 5 and 6.

Referring now to FIG. 2, there is shown a storage area network (SAN) fibre channel arbitrated loop (FCAL) multi-system, multi-resource, storage enclosure with four IO adapters arranged in accordance with the preferred embodiment generally designated by the reference character 200. In FIG. 2, the same reference numbers as used in FIG. 1 are used for identical or similar components. Storage enclosure 200 includes features of storage enclosure 100. For example, the SES node cards 1, 2, 101 in storage enclosure 200 similarly are provided on removable cards, rather than on the backplane. Out-of-band communications with SES node cards 1, 2, 101 are provided with I2C buses I2C1–I2C8, 118 respectively coupled to the SES chip 1, 2 102. Concurrent maintenance of the SES node cards 1, 2, 101 with device operations is enabled in accordance with the preferred embodiment. Concurrent maintenance actions for the SES node cards 1, 2, 101 are accomplished following the same sequential steps as concurrent maintenance actions for devices 114.

Storage enclosure 200 includes four IOAs 1–4 coupled to SAN fabric 120 and respectively coupled to SES chips 1, 2, 102 via I2C busses I2C1, I2C2, I2C3, I2C4, I2C5, I2C6, I2C7, and I2C8. As shown in FIG. 2, each SES node cards 1, 2 is used with two physical device buses or loops, FC loop 1, 2, 3, 4, 104. SES node card 1 supports FC loops 1, 3, 104 and SES node card 2 supports FC loops 2, 4, 104. Storage enclosure 200 reduces product cost including one SES node card per two FC loops rather than requiring a SES node per each FC loop. It should be understood that the present invention is not limited to two FC loops per SES node. Both SES node cards 1, 2, 101 include PBCs 1-x and x+1-n, 106, each respectively providing redundant paths to DASDs1-x and x+1-n, 114.

Figure 4:
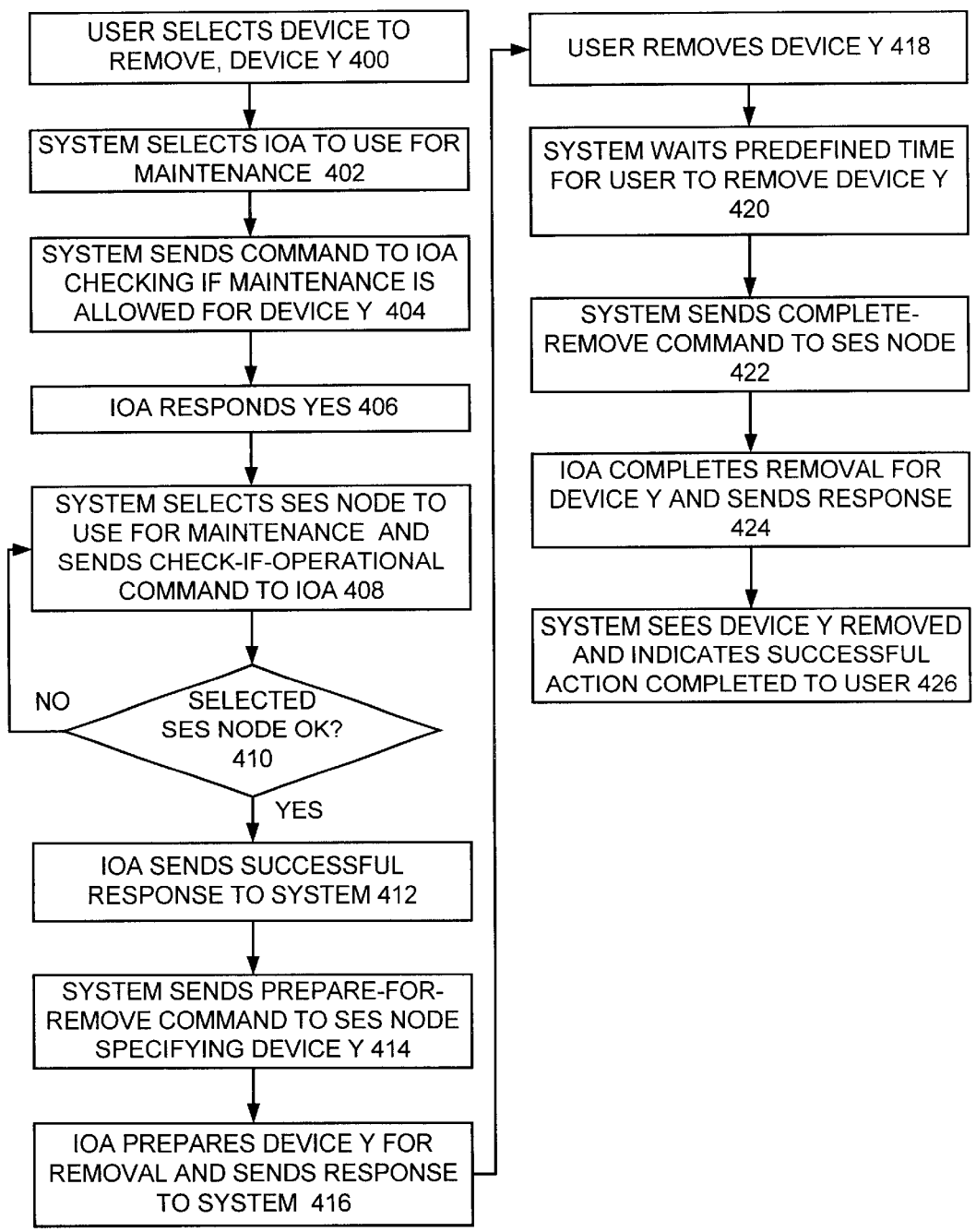
Figure 6:
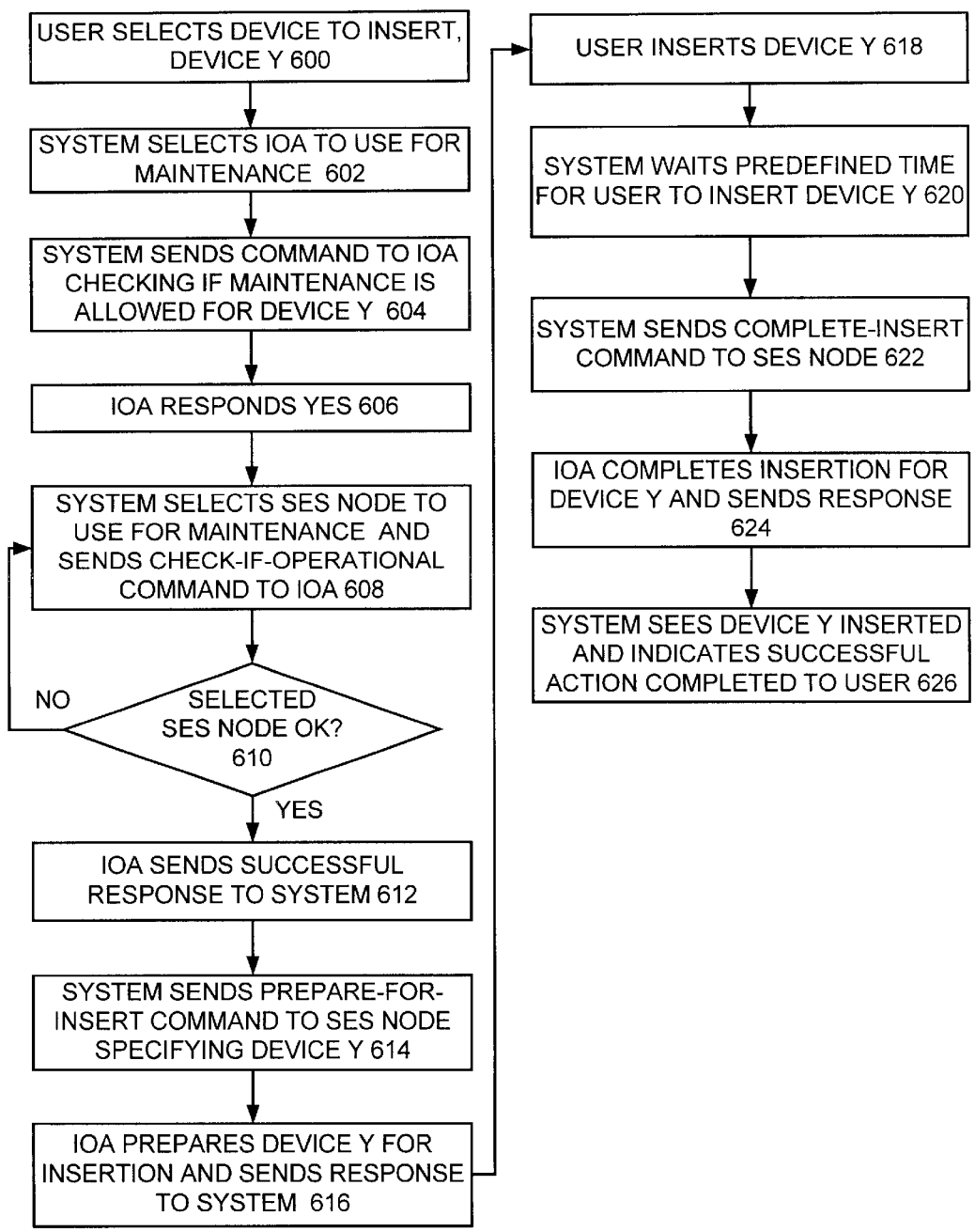

In accordance with the preferred embodiments, enclosure maintenance is performed concurrently with device operations and identical maintenance procedures are implemented for the SES node cards 101 and the storage devices 114. A SES node card 101 is reported to the system as any resource and the normal problem analysis and recovery tools operate on the SES node card. An IOA 112 can log errors against a faulting SES node card 101 to indicate the need for replacement. Device bus or loop errors can also be logged against the SES node card 101. This allows easy identification of the specific component to be replaced because it is specifically identified in the system error log. Once the system determines that a SES node card 101 needs to be replaced, steps illustrated and described with respect to FIGS. 4 and 6 are used. After the SES node card 101 is replaced the system is informed of the VPD for the new SES node card. The IOA checks VPD after each loop failure/recovery incident and reports the new SES node VPD to the system. The VPD check is done so the set of IOAs connected to a SES node do not have to communicate directly with each other as part of the SES node concurrent maintenance action.

Figure 3:
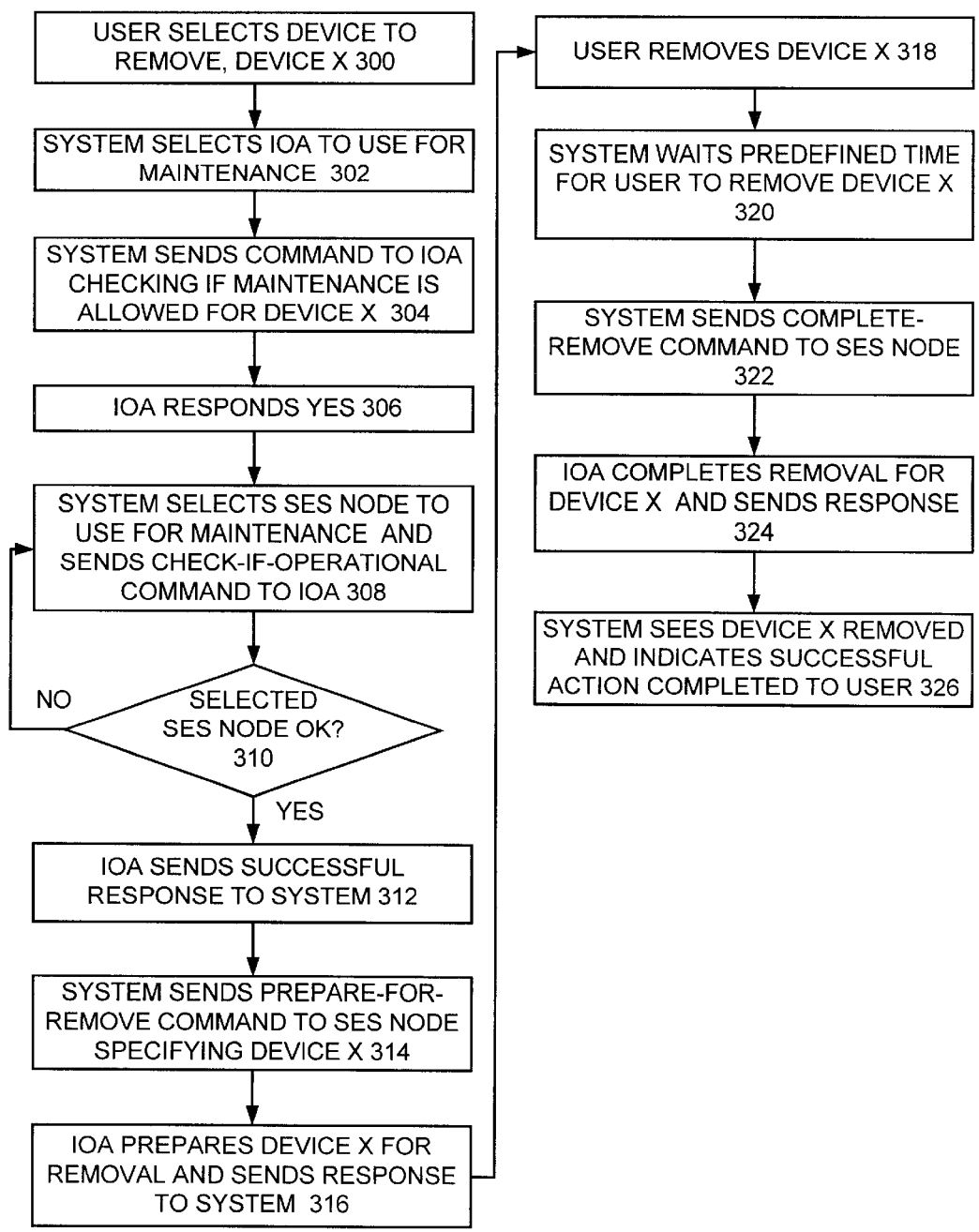
FIGS. 3 and 4 are flow charts respectively illustrating exemplary sequential steps for device and SES node removal for enclosure maintenance concurrent with device operations in accordance with the preferred embodiment.

Referring now to FIG. 3, there are shown exemplary sequential steps for device removal for enclosure maintenance concurrent with device operations in accordance with the preferred embodiment. A device X to be removed is selected by a user as indicated in a block 300. Next the system selects an IOA to be used for maintenance as indicated in a block 302. A command is sent by the system to the IOA asking if maintenance is allowed for device X as indicated in a block 304. The IOA responds with yes for normal case as indicated in a block 306. The system selects a SES node to use for maintenance and verifies SES node is operational with a check-if operational command to the IOA for maintenance on device X as indicated in a block 308. IOA receives the check-if-operational command, checks the selected SES node as indicated in a decision block 310. IOA responds with failure when the selected SES node is not operational or missing and the system tries a different SES node at block 308. IOA responds with success when the selected SES node is operational and the system continues on as indicated in a block 312. The system sends a prepare-for-remove command to the SES node specifying device X as indicated in a block 314. The IOA prepares device X for removal, such as quiescing device bus, removing slot power and turning identify LED on, and IOA sends response to system as indicated in a block 316. Then the user removes device X as indicated in a block 318. The system waits for a predefined time for the user to remove device X as indicated in a block 320. The system sends complete-remove command to the SES node as indicated in a block 322. Then the IOA completes removal for device X, such as unquiescing device bus to allow commands to be sent to other devices on loop and turning identify LED off, and IOA sends response to system indicating whether or not the device X was removed as indicated in a block 324. The system sees device X removed and indicates successful action completed to the user as indicated in a block 326.

Referring now to FIG. 4, there are shown exemplary sequential steps for SES node card removal for enclosure maintenance concurrent with device operations in accordance with the preferred embodiment. In accordance with the preferred embodiment, the SES node card is treated like a device, allowing reuse of existing architecture, implementation, and user expectations, thereby minimizing user errors. A SES node card or device Y to be removed is selected by a user as indicated in a block 400. Next the system selects an IOA to be used for maintenance as indicated in a block 402. A command is sent by the system to the IOA asking if maintenance is allowed for device Y as indicated in a block 404. The IOA responds with yes for normal case as indicated in a block 406. The system selects a SES node to use for maintenance and verifies SES node is operational with a check-if-operational command to the IOA for maintenance on device Y as indicated in a block 408. IOA receives the check-if operational command, checks the selected SES node as indicated in a decision block 410. IOA responds with failure when the selected SES node is not operational or missing and the system tries a different SES node at block 408. IOA responds with success when the selected SES node is operational and the system continues on as indicated in a block 412. The system sends a prepare-for-remove command to the SES node specifying device Y as indicated in a block 414. The IOA prepares device Y for removal, such as quiescing device bus, removing slot power and turning identify LED on, and IOA sends response to system as indicated in a block 416. Then the user removes device Y as indicated in a block 418. The system waits for a predefined time for the user to remove device Y as indicated in a block 420. The system sends complete-remove command to the SES node as indicated in a block 422. Then the IOA completes removal for device X, such as unquiescing device bus to allow commands to be sent to other devices on loop and turning identify LED off, and IOA sends response to system indicating whether or not the device Y was removed as indicated in a block 424. The system sees device Y removed and indicates successful action completed to the user as indicated in a block 426.

Figure 5:
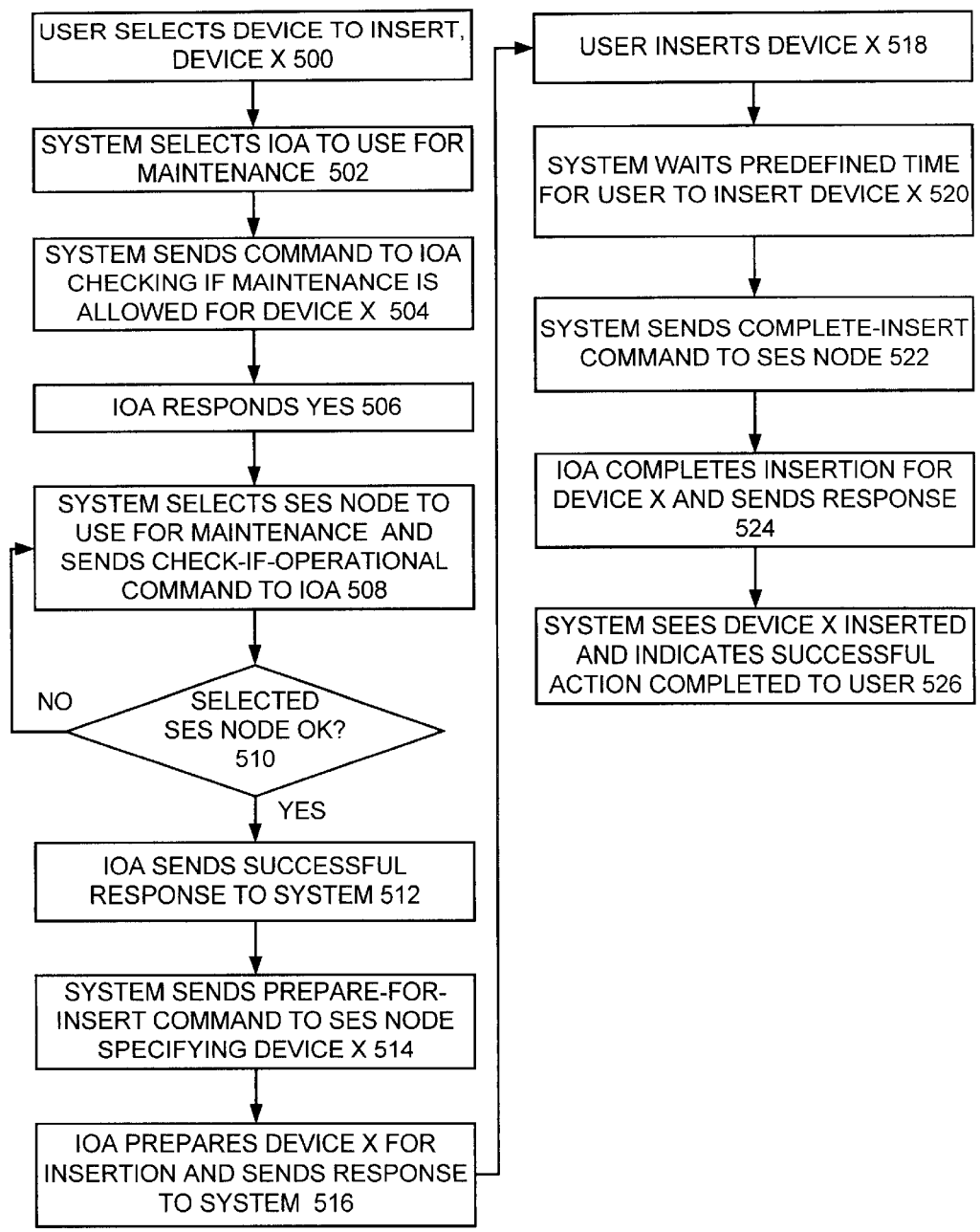
FIGS. 5 and 6 are flow charts respectively illustrating sequential steps for device and SES node insertion for enclosure maintenance concurrent with device operations in accordance with the preferred embodiment.

Referring now to FIG. 5, there are shown exemplary sequential steps for device insertion for enclosure maintenance concurrent with device operations in accordance with the preferred embodiment. A device X to be inserted is selected by a user as indicated in a block 500. Next the system selects an IOA to be used for maintenance as indicated in a block 502. A command is sent by the system to the IOA asking if maintenance is allowed for device X as indicated in a block 504. The IOA responds with yes for normal case as indicated in a block 506. The system selects a SES node to use for maintenance and verifies SES node is operational with a check-if operational command to the IOA for maintenance on device X as indicated in a block 508. IOA receives the check-if-operational command, checks the selected SES node as indicated in a decision block 510. IOA responds with failure when the selected SES node is not operational or missing and the system tries a different SES node at block 508. IOA responds with success when the selected SES node is operational and the system continues on as indicated in a block 512. The system sends a prepare-for-insert command to the SES node specifying device X as indicated in a block 514. The IOA prepares device X for insertion, such as quiescing device bus and turning identify LED on, and IOA sends response to system as indicated in a block 516. Then the user inserts device X as indicated in a block 518. The system waits for a predefined time for the user to insert device X as indicated in a block 520. The system sends complete-insert command to the SES node as indicated in a block 522. Then the IOA completes insertion for device X, such as unquiescing device bus to allow commands to be sent to other devices on loop, turning slot power on and turning identify LED off, and IOA sends response to system indicating whether or not the device X was inserted as indicated in a block 524. The system sees device X inserted and indicates successful action completed to the user as indicated in a block 526.

Referring now to FIG. 6, there are shown exemplary sequential steps for SES node card insertion for enclosure maintenance concurrent with device operations in accordance with the preferred embodiment. A SES node card or device Y to be inserted is selected by a user as indicated in a block 600. Next the system selects an IOA to be used for maintenance as indicated in a block 602. A command is sent by the system to the IOA asking if maintenance is allowed for device Y as indicated in a block 604. The IOA responds with yes for normal case as indicated in a block 606. The system selects a SES node to use for maintenance and verifies SES node is operational with a check-if-operational command to the IOA for maintenance on device Y as indicated in a block 608. IOA receives the check-if operational command, checks the selected SES node as indicated in a decision block 610. IOA responds with failure when the selected SES node is not operational or missing and the system tries a different SES node at block 608. IOA responds with success when the selected SES node is operational and the system continues on as indicated in a block 612. The system sends a prepare-for-insert command to the SES node specifying device Y as indicated in a block 614. The IOA prepares device Y for insertion, such as quiescing device bus and turning identify LED on, and IOA sends response to system as indicated in a block 616. Then the user inserts device Y as indicated in a block 618. The system waits for a predefined time for the user to insert device Y as indicated in a block 620. The system sends complete-insert command to the SES node as indicated in a block 622. Then the IOA completes insertion for device X, such as unquiescing device bus to allow commands to be sent to other devices on loop, turning slot power on and turning identify LED off, and IOA sends response to system indicating whether or not the device Y was inserted as indicated in a block 624. The system sees device Y inserted and indicates successful action completed to the user as indicated in a block 626.

While the present invention has been described with reference to the details of the embodiments of the invention shown in the drawing, these details are not intended to limit the scope of the invention as claimed in the appended claims.

What is claimed is:

1. A storage area network (SAN), fibre channel arbitrated loop (FCAL) multiple system, multiple resource storage enclosure comprising:
   a plurality of storage resources;
   a plurality of IO adapters (IOAs) coupled to the storage area network;
   a pair of enclosure services node cards, each said enclosure services node cards including fibre channel (FC) connections for said plurality of storage resources;
   each said enclosure services node card including a respective global bus connection and a FC connection to each of said plurality of IOAs; and
   each said enclosure services node card including a plurality of port bypass circuits (PBCs) coupled to said plurality of storage resources and said plurality of IO adapters (IOAs) with FCAL connections;
   each said enclosure services node card including a controller chip for controlling said plurality of port bypass circuits (PBCs); and
   each said enclosure services node card being used concurrently by the multiple systems to manage said plurality of storage resources.

2. A storage area network (SAN), fibre channel arbitrated loop (FCAL) multiple system, multiple resource storage enclosure comprising:
   a plurality of storage resources; a plurality of IO adapters (IOAs) coupled to the storage area network;
   a pair of enclosure services node cards, each said enclosure services node cards including fibre channel (FC) connections for said plurality of storage resources;
   each said enclosure services node card including a respective global bus connection and a FC connection to each of said plurality of IOAs;
   each said enclosure services node card being used concurrently by the multiple systems to manage said plurality of storage resources; and
   each said enclosure services node card including a plurality of port bypass circuits (PBCs) coupled to said plurality of storage resources and said plurality of IO adapters (IOAs) with FCAL connections; said port bypass circuits (PBCs) control whether each of said plurality of storage resources and said plurality of IO adapters (IOAs) are on a FC loop.

3. A storage area network (SAN), fibre channel arbitrated loop (FCAL) multiple system, multiple resource storage enclosure as recited in claim 2 wherein each said removable enclosure services node card includes an associated FC loop.

4. A storage area network (SAN), fibre channel arbitrated loop (FCAL) multiple system, multiple resource storage enclosure as recited in claim 2 wherein each said enclosure services node card includes at least one pair of associated FC loops.

5. A storage area network (SAN), fibre channel arbitrated loop (FCAL) multiple system, multiple resource storage enclosure as recited in claim 2 wherein said respective global bus connection to each of said plurality of IOAs of each said enclosure services node cards includes an inter integrated circuit (I2C) bus connection to each of said plurality of IOAs.

6. A storage area network (SAN), fibre channel arbitrated loop (FCAL) multiple system, multiple resource storage enclosure as recited in claim 2 wherein each said enclosure services node cards including fibre channel (FC) connections for said plurality of storage resources provide redundant paths to each said storage resource and allows access to data on said plurality of storage resources to continue when one of said pair of said enclosure services node cards fails or is being maintained.

7. A storage area network (SAN), fibre channel arbitrated loop (FCAL) multiple system, multiple resource storage enclosure as recited in claim 2 wherein each said enclosure services node card includes vital product data and all active components for an associated FC loop and wherein said enclosure services node cards are removable cards.

8. A storage area network (SAN), fibre channel arbitrated loop (FCAL) multiple system, multiple resource storage enclosure as recited in claim 2 wherein said enclosure services node cards are removable cards and maintenance of said enclosure services node cards is enabled for one of said enclosure services node cards to be removed and inserted for maintenance concurrently with operations of said storage resources.

9. A storage area network (SAN), fibre channel arbitrated loop (FCAL) multiple system, multiple resource storage enclosure as recited in claim 2 wherein identical maintenance procedures used for said storage resources are used for maintenance of one of said enclosure services node cards.

10. A storage area network (SAN), fibre channel arbitrated loop (FCAL) multiple system, multiple resource storage enclosure comprising:

a plurality of storage resources;

a plurality of IO adapters (IOAs) coupled to the storage area network;

a pair of enclosure services node cards, each said enclosure services node cards including fibre channel (FC) connections for said plurality of storage resources;

each said enclosure services node card including a respective global bus connection and a FC connection to each of said plurality of IOAs;

each said enclosure services node card being used concurrently by the multiple systems to manage said plurality of storage resources; and a plurality of port bypass circuits (PBCs) coupled to said plurality of storage resources and said plurality of IO adapters (IOAs) with FCAL connections; and each said enclosure services node card including an enclosure services chip, said enclosure services chip providing control to said port bypass circuits (PBCs).

11. A storage area network (SAN), fibre channel arbitrated loop (FCAL) multiple system, multiple resource storage enclosure as recited in claim 10 wherein said enclosure services chip includes said respective global bus connection to each of said plurality of IOAs.

12. A method for performing storage enclosure maintenance concurrent with device operations, said storage enclosure including a plurality of storage devices and a plurality of IO adapters (IOAs) coupled to multiple systems via a storage area network, said method comprising the steps of:

providing a pair of removable enclosure services node cards in the storage enclosure, each said removable enclosure services node card including an address;

providing redundant paths to each storage device with each said enclosure services node cards including loop connections for said plurality of storage devices;

providing each said removable enclosure services node card with a respective global bus connection and a loop connection to each of said plurality of IOAs;

providing active components including port bypass circuits (PBCs) on said removable enclosure services node cards and said port bypass circuits (PBCs) controlling whether each of said plurality of storage resources and said plurality of IOAs are on a FC loop; and implementing identical maintenance procedures for said removable enclosure services node cards and said storage devices.

13. A method for performing storage enclosure maintenance concurrent with device operations as recited in claim 12 wherein the step of implementing identical maintenance procedures for said removable enclosure services node cards and said storage devices includes the step of allowing access to said storage devices to continue when one of said removable enclosure services node cards is being maintained using the other one of said removable enclosure services node cards.

14. A method for performing storage enclosure maintenance concurrent with device operations as recited in claim 12 wherein said loop connections include fibre channel arbitration loop (FCAL) connections.

15. A method for performing storage enclosure maintenance concurrent with device operations as recited in claim 12 wherein said respective global bus connection to each of said plurality of IOAs include a respective inter integrated circuit (I2C) bus connection to each of said plurality of IOAs.

16. A method for performing storage enclosure maintenance concurrent with device operations as recited in claim 12 wherein the step of implementing identical maintenance procedures for said removable enclosure services node cards and said storage devices includes the step, when one of said removable enclosure services node card is being maintained, of using the other one of said removable enclosure services node cards, and communicating with said other one of said removable enclosure services node cards using said global bus connection.

* * * * *